(12) United States Patent
Stigwall et al.

(10) Patent No.: US 12,717,040 B2
(45) Date of Patent: Aug. 25, 2026

(54) MEASURING DEVICE WITH TOF SENSOR

(71) Applicant: HEXAGON INNOVATION HUB GMBH, Heerbrugg (CH)

(72) Inventors: Johan Stigwall, St. Gallen (CH); Zheng Yang, Friedrichshafen (DE); Thomas Jensen, Rorschach (CH); Martin Mayer, Frastanz (AT)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 452 days.

(21) Appl. No.: 18/240,003

(22) Filed: Aug. 30, 2023

(65) Prior Publication Data

US 2024/0069204 A1 Feb. 29, 2024

(30) Foreign Application Priority Data

Aug. 30, 2022 (EP) .................................... 22192938

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4812* (2013.01); *G01S 7/4817* (2013.01); *G01S 7/51* (2013.01);
(Continued)

(58) Field of Classification Search
CPC ...... G01S 17/894; G01S 17/86; G01S 7/4812; G01S 7/4817; G01S 7/51; G01S 7/4865;
(Continued)

(56) References Cited

U.S. PATENT DOCUMENTS 12,356,077 B2 * 7/2025 Stigwall ............... H04N 23/695
2010/0141928 A1 * 6/2010 Embry ................... G01S 7/497 356/5.01

(Continued)

FOREIGN PATENT DOCUMENTS

CA 3089205 A1 * 7/2019 ............ H04N 23/56
CN 210274243 U 7/2020

(Continued)

OTHER PUBLICATIONS

EESR and Written Opinion in Application No. 22192938.3 dated Feb. 22, 2023.

(Continued)

*Primary Examiner* — Jacob Y Cho
(74) *Attorney, Agent, or Firm* — Maschoff Brennan

(57) ABSTRACT

A measuring device for acquiring a three-dimensional measuring point related to a target in a scene, the measuring device comprises a base unit, a support unit mounted on the base unit, a distance measuring unit comprising an emitting unit configured for emitting measuring radiation and a receiving unit configured for detecting at least a part of the measuring radiation reflected by the target and a directing unit mounted in the support unit configured for directing the measuring radiation towards the scene. The measuring device comprises a capturing unit, wherein the capturing unit is configured for capturing at least a scene image of at least part of the scene, the scene image is generated by the detection of visual-spectrum light, and a controlling and processing unit, wherein the controlling and processing unit is configured for aligning the directing unit.

15 Claims, 2 Drawing Sheets

(51) Int. Cl.

| | |
|---|---|
| ***G01S 7/51*** | (2006.01) |
| ***G01S 17/86*** | (2020.01) |
| ***G06V 20/50*** | (2022.01) |
| ***H04N 23/11*** | (2023.01) |
| ***H04N 23/56*** | (2023.01) |
| ***H04N 23/74*** | (2023.01) |

(52) U.S. Cl.
CPC .............. *G01S 17/86* (2020.01); *G06V 20/50* (2022.01); *H04N 23/11* (2023.01); *H04N 23/56* (2023.01); *H04N 23/74* (2023.01)

(58) Field of Classification Search
CPC ..... G01S 7/4866; G01S 7/4868; G06V 20/50; H04N 23/74; H04N 23/56; H04N 23/11
See application file for complete search history.

(56) References Cited

U.S. PATENT DOCUMENTS

| | | | | |
|---|---|---|---|---|
| 2015/0015895 | A1* | 1/2015 | Bridges | G01B 11/005 356/614 |
| 2016/0102976 | A1* | 4/2016 | Müller | G01C 3/02 356/4.01 |
| 2017/0363421 | A1* | 12/2017 | Kumagai | G01C 3/08 |
| 2018/0224527 | A1 | 8/2018 | Lüthi et al. | |
| 2022/0172406 | A1* | 6/2022 | Mueller | G01C 11/025 |
| 2022/0321779 | A1* | 10/2022 | Stigwall | G01C 15/002 |
| 2024/0068810 | A1* | 2/2024 | Stigwall | G01S 17/46 |
| 2024/0069204 | A1* | 2/2024 | Stigwall | G01S 17/87 |

FOREIGN PATENT DOCUMENTS

| | | | | |
|---|---|---|---|---|
| EP | 1 686 350 A | | 8/2006 | |
| JP | 2018503198 A | * | 2/2018 | G02B 27/017 |
| WO | 2015006526 A1 | | 1/2015 | |
| WO | WO-2022080036 A1 | * | 4/2022 | G01B 11/24 |

OTHER PUBLICATIONS

Gerald Zach et al.: “A 16\, \times 16 Pixel Distance Sensor With In-Pixel Circuitry That Tolerates 150 klx of Ambient Light”, IEEE Journal of Solid-State Circuits IEEE, USA, vol. 45, No. 7, Jul. 1, 2010 (Jul. 1, 2010), pp. 1345-1353.

* cited by examiner

MEASURING DEVICE WITH TOF SENSOR

FIELD OF THE DISCLOSURE

The present disclosure relates to a measuring device for acquiring three-dimensional measuring points, in particular a geodetic measuring instrument. Examples of such instruments are total stations, theodolites, or laser scanners.

BACKGROUND

Surveying or measuring systems for determining positions in the field of geodesy or the area of construction sites and/or construction are known in manifold forms. Examples of these are systems made up of a stationary surveying device having direction and distance meter, for example, a total station, and an auxiliary instrument marking a point to be surveyed or identified. A geodetic measuring device of the prior art is described, for example, in the published application EP 1 686 350.

Numerous different embodiments are known with respect to the design of measuring devices. Thus, for example, modern total stations have microprocessors for digital processing and storage of acquired measurement data. The devices generally have a compact and integrated structure, wherein typically coaxial distance measuring elements and computer, control, and storage units are provided in the device. Depending on the configuration level of the total station, a motorization of the targeting and/or aiming unit and also—in the case of the use of retroreflectors (such as a 360° prism) as target objects—means for automatic target search and tracking can be integrated.

As a human-machine interface, the total station can comprise an electronic display-control unit—generally a microprocessor computer unit having electronic data storage means—having display screen and input means, for example, a keyboard. The acquired measurement data are supplied to the display-control unit, so that the position of the target point is ascertainable, visually displayable, and storable by the display-control unit. Total stations known from the prior art can moreover have a radio data interface for establishing a radio connection to external peripheral components, for example, to the measuring aid instrument or to a handheld data acquisition device, which can be designed in particular as a data logger or field computer.

For aiming at and/or targeting the target point to be surveyed, generic geodetic surveying devices comprise a telescopic sight, for example, an optical telescope, as an aiming unit. The telescopic sight is generally rotatable around a vertical standing axis and around a horizontal tilt axis in relation to a base of the measuring device, so that the telescope can be aligned on the point to be surveyed by pivoting and tilting. Modern devices comprise, in addition to the optical visual channel, a camera, which is integrated into the telescopic sight and is aligned, for example, coaxially or in parallel, for acquiring an image, wherein the acquired image can be represented in particular as a live image on the display screen of the display-control unit and/or on a display screen of the peripheral device—for example, of the data logger—used for remote control.

In many measuring applications, measuring of points is performed in that specially designed measuring aid instruments or target objects (for example, surveying rods) are placed at the target point. These usually consist of a pole having a reflector (for example, a 360° prism) for defining the measurement distance or the measurement point. In such surveying tasks, data, instructions, speech, and further items of information are typically transmitted between target object and central measuring device for controlling the measuring procedure and for defining or registering measurement parameters. Examples of such data are identification information for the target object (for example, type of the prism used), inclination of the pole, height of the reflector above ground, reflector constants, or measured values such as temperature or air pressure. These items of information and/or situation-related parameters are required to enable high-precision targeting and surveying of the measurement point defined by the pole having prism.

For measuring a measuring point in a scene, typically, a target or target object (e.g. pole) is located at or near the measuring point and the position of the measuring point is determined by measuring distance and direction to the target by means of the measuring device.

For that, in a first step, the respective target to be measured has to be identified. However, since such target may be located far away from the measuring device, identification may become comparatively challenging. This is even more true in case there are multiple targets in the scene and a particular one of the targets has to be identified and measured.

Typical surveying devices have come to comprise as a standard feature an automatic target aiming and tracking function for prisms used as target reflectors (ATR: "Automatic Target Recognition"). For this purpose, for example, a further separate and a special ATR detector (for example, CCD surface sensor or CMOS) sensitive to the wavelength of the ATR light source are additionally integrated into the telescope.

Known measuring devices provide specific solutions for searching for targets. As for example, a common approach makes use of flashed illumination of the scene with IR (infra-red) light and detection of target-reflected light in the IR spectrum. The reflected IR light may be detected by means of an IR sensitive sensor, wherein the reflected IR light impinges on respective pixels of the sensor. Based on the locations of respectively excited pixels directions to the targets can be derived.

According to an alternative approach, illumination of the targets may be provided by moving a fan of (IR) search light over the scene and detecting respective orientations of the fan at any time a reflection of the search light is detected by a sensor.

While such search approaches of above work quite reliable for defined and singular targets, there may result ambiguities in case there are multiple targets in a scene or there may result errors in target identification in case the search light is reflected by an object which is not a target.

For such use cases the measuring device may comprise a display and an image of the scene may be displayed with possible targets overlaid with the image. A user may thus be enabled to manually choose a particular target to be measured based on a determined location of the target in the scene.

However, even if the target can be selected manually by a user, there still can remain uncertainties if the selected target in fact is the target which should be measured. This may be true for targets which are very close to each other with respect to their aiming directions or in case some of the automatically found targets are not real geodetic targets but may result from unintentional reflections. Such situation might not only occur during aiming but can also happen in case of tracking where the situation with multiple targets can become quite dynamic, e.g. crossing of targets.

Object of the Disclosure

It is therefore an object of the present disclosure to provide a measuring device which overcomes above mentioned problems.

A further object of the present disclosure is to provide a measuring device which provides improved capability for searching and/or identifying targets in a measuring scene.

SUMMARY

The present disclosure relates to measuring devices of the surveying type, like total stations or laser scanners.

Typically surveying devices provide a so called ATR (Automatic Target Recognition) functionality which provides to search and find particular targets in a scene by means of detecting sensor data, and an on-axis camera (OAC) to provide an image of the scene.

Both the OAC and ATR typically use the same optics of the device to image a comparatively small field of view. The two cameras have different specifications. However, the present disclosure also relates to combine the two functionalities into one sensor for savings in terms of optical complexity, size, cost, and the possibility to adjust the focus position for aiming on targets.

Looking at the resolutions of the sensors, the resolution may be at least 1 Mpx or 5 Mpx for capturing a respective image.

Spectrally, the sensor may also provide (N)IR sensitivity, in particular switchable. An IR-cut filter may be attached which transmits e.g. 10% within the respective spectral bandwidth.

Alternatively or additionally, a mechanically switchable filter or a visible wavelength illumination source can be provided.

When alternating between ATR and OAC imaging (active illumination for ATR on/off and different exposure times) it would be possible to provide a clear OAC image without any ATR disturbance while at the same time running the ATR.

The present disclosure is further directed to arrange a TOF (Time-Of-Flight) sensor in the measuring device and to make use of the data provided by the TOF sensor for identifying a target in the scene. Since the TOF sensor can provide image data but also range or amplitude data for each pixel, such range information can be utilised to provide more reliable and more accurate target identification. Moreover, a target can be tracked in improved manner if TOF range data is considered for tracking the target. This becomes even more relevant in case measuring radiation emitted by the EDM (electronic distance meter) does no longer impinge on the target, e.g. in case of abrupt and unintentional movement of the target.

The TOF sensor can be arranged instead of any other image sensors and can provide range data as mentioned but also image data.

The TOF sensor can also be configured to provide ATR functionality, e.g. by selectively detecting light of the visual (VIS) spectrum but also of the infrared (IR), in particular near infrared (NIR), spectrum. Since the ATR functionality makes use of illuminating at least a part of the scene with IR or NIR light the sensor is preferably configured for respective detection.

A TOF sensor may provide to detect a reflector by active illumination (typically in NIR) and to obtain range and direction (location) information. The TOF sensor may also be configured to provide an image of the scene with ambient light (typically in NIR). Such information from an TOF sensor or an image from an OAC (typically in VIS) may be used to improve classification of targets by utilizing the scene information or reflector context.

By thus providing a single sensor which can acquire ATR information regarding a direction to a target and also (coarse) range information for the target or a region around (near to) the target a search and identification of potential targets becomes significantly more efficient and accurate while the structural complexity of the device can be reduced.

TOF arrays (sensors) can be categorised into two types: indirect TOF such as Sony IMX567 (640×480 pix.) and direct TOF such as OnSemi Pandion. The 4D data (3D point clouds+intensity) of such TOF arrays allow to enhance the functionality of ATR and power search. ATR system exploits the intensity information to aim on a moving prism pole. If there are multiple prism targets located inside the illumination light cone, they might not be only selectable based on intensity. One idea to improve tracking stability is related to replace the camera chip with TOF array, so that separation and selection of multiple targets is improved based on distance data. The TOF Array may also be used for searching of a target.

At least two indirect-TOF Sensors are commercially available. While the first technology CAPD (Current Assisted Photonic Demodulator, e.g. Sony) is widely utilised in TOF cameras, the second technology implemented in Heliotis S4 camera chip (Lock-In 2D detector) is designed for demodulating the envelope of correlogram of white light interferometry. Both technologies differ from each other at their demodulation frequencies and frame rate. While the high demodulation frequency of Sony IMX 556 can be used to achieve mm depth resolution of TOF camera, high frame rate of Heliotis S4 can be advantageous for fast depth scan of white light interferometry.

As for example, a sensor using CAPD technology (Current Assisted Photonic Demodulator) is the IMX556PLR (Sony) with backside-illuminated technology and improved demodulation frequency. Thanks to the backside-illuminated technology, the quantum efficiency for 850 nm is as high as 56.6%. In each pixel, two effective pixels are integrated. By applying "Push-Pull" voltage on the electrodes, generated photon electrons can be guided to one or the other pixel. The frequency of this switching mechanism can be synchronized with the illumination frequency. This mechanism is equivalent to sample the intensity at 0° and 180° of a 4-phase-shift algorithm. In order to unambiguously calculate phase and amplitude, intensity at 90° and 270° can be acquired by shifting the switching timing by 90°. The two resulting 0° and 90° micro-frames deliver the four intensity values A1, A2, A3 and A4 from which the phase and amplitude can be calculated.

Concerning the Lock-In 2D detector, each pixel has individual analogue circuit to directly suppress DC part of modulated light and demodulate its amplitude and phase on pixel level. This on-pixel analogue operation can avoid large computational effort in traditional digital processing unit and boost extremely acquisition speed of signal demodulation. This feature enables Heliotis to offer white light interferometric system with unusually high depth scanning speed up to 50 mm/sec. Every pixel is a "smart pixel" and has a photon sensitive photodiode which is AC-coupled and equipped with individual analogue circuit with two channels (Q and I). The photon current in both channels is filtered through multiplication and integrator circuit. The output signal Q(t) and I(t) is digitized and forwarded to FPGA unit for digital post-processing. Depending on the use case, further numeric operation can be carried out in FPGA to achieve the target signal. In case of distance measurement via time-of-flight, the light source can be modulated with fixed frequency. The distance between transceiver and target is encoded in the phase of detected photon current at the smart pixel. In case of background suppression on pixel-level, the amplitude modulation of a modulated light source should be detected. In case of Target ID detection, the carrier frequency of the multiplication circuit can be swept in order to scan the frequency of modulated light source. If the demodulation frequency is matched to the carrier frequency of light source, then the image will show bright spot, otherwise the image remains dark.

Respectively, the disclosure relates to a measuring device for acquiring a three-dimensional measuring point related to a target in a scene, wherein a target identifier may be associated with the target. The measuring device comprises a base unit, a support unit mounted on the base unit and rotatable relative to the base unit around an azimuth axis and a distance measuring unit comprising an emitting unit configured for emitting collimated measuring radiation and a receiving unit configured for detecting at least a part of the collimated measuring radiation reflected by the target. The distance measuring unit may be configured to derive a distance to an object (e.g. target) by emitting the measuring radiation to the object and detecting a part of the radiation which is reflected by the object. Several measuring principles for deriving the distance based on such approach are well known in the art, like time-of-flight measurement or WFD (wave form digitising).

The device also comprises a directing unit mounted in the support unit, rotatable relative to the support unit around an elevation axis, and configured for directing the measuring radiation towards the scene. A first actuator can be arranged for rotating the support unit relative to the base unit around the azimuth axis, a second actuator can be arranged for rotating the directing unit relative to the support unit around the elevation axis, a first angle encoder can be arranged for measuring a rotatory position of the support unit and a second angle encoder can be arranged for measuring a rotatory position of the directing unit.

The device comprises a capturing unit, wherein the capturing unit is configured for capturing at least a scene image of at least part of the scene. The scene image can be generated by the detection of visual-spectrum (VIS) light and/or near-infrared-spectrum (NIR) light. Such scene image may provide an overview image or an image showing a target to be measured for an operator for e.g. precisely aiming a target.

The measuring device comprises an illumination unit configured for illuminating at least a part of the scene with illumination radiation, wherein the illumination radiation comprises at least a modulated illumination signal.

The emitting unit is configured to emit collimated measuring radiation which in particular is provided as a collimated laser beam. Such beam is typically be used to be directed to a retro-reflective target and a reflected portion of the beam is detected by the receiving unit. By that, a distance to the target can be derived in very accurate manner as known in the art.

In contrast to the emitting unit, the illumination unit provides illumination radiation (light) for illuminating not only a retro-reflector of a target but for illuminating a comparatively larger surveying scene, i.e. a field of illumination is significantly greater than a field which can be illuminated by means of the emitted measuring radiation having a (very) small beam divergence. In other words, the opening angle for the illumination radiation is greater than the opening angle for the measuring radiation.

A controlling and processing unit is comprised by the device, wherein the controlling and processing unit is at least configured for aligning the directing unit.

The capturing unit comprises a Time-Of-Flight (TOF) sensor, wherein the TOF sensor is configured for providing the scene image by generating pixel-related image data, wherein the scene image is generated by detection of visual-spectrum (VIS) and/or near-infrared-spectrum (NIR) light by means of the TOF sensor. Hence, the TOF sensor can be embodied and configured to capture and provide a visual image of at least a part of the scene. By that, not only range data together with directions can be processed, but such data can be combined with visual image data to provide a more expressive impression of the scene and/or targets.

The TOF sensor is also configured for providing pixel-related TOF data of at least part of the scene, the TOF data comprises at least range data and/or amplitude data for each pixel. The pixel-related TOF data is associated with the pixel-related image data so that each pixel of the pixel-related TOF data is assigned to at least one pixel of the pixel-related image data.

The controlling and processing unit comprises a target search functionality which is configured for controlling the target illumination unit so that at least a part of the scene is illuminated and for controlling the TOF sensor so that pixel-related TOF data of at least a part of the illuminated scene is obtained as search data, wherein illuminating at least a part of the scene and obtaining the search data are synchronised so that the search data is obtained for at least the part of the scene during its illumination.

The controlling and processing unit comprises a target identification functionality which is configured for processing the search data and to derive target information based on the search data, wherein the target information comprises a direction to the target with respect to the measuring device and TOF data associated to the target.

In context of the present disclosure, pixel-related data should preferably be understood to be data comprising a plurality of detection values which are distributed over a defined (detection) area (e.g. sensor plane) and which are arranged in a defined scheme, e.g. rows and columns. Hence, pixel-related image data should preferably be understood to comprise particular and different image values like colours and/or brightness which provide a respective image. Even more specifically, pixel-related image data may provide an image by a defined arrangement of pixels of different pixel values.

In one embodiment, the range data comprises a distance value for each pixel or range information for each pixel related to range measurement with a TOF sensor. The distance value can be derived by processing control data of the illumination device and the TOF sensor, e.g. a signal for emitting the illumination light or a starting pulse and a pixel-related signal for receiving reflected light. The range information can comprise a duration of light propagation starting with emitting the illumination light and ending with receiving the reflected light.

According to one embodiment, the pixel-related image data can be generated or be provided by detecting a non-modulated signal of the visual-spectrum (VIS) light and/or the near-infrared-spectrum (NIR) light by means of the TOF sensor, in particular a non-modulated illumination signal of the illumination radiation. Hence, a scene image can be derived by detecting a non-modulated portion of the emitted light.

According to one embodiment, the pixel-related TOF data can be generated or be provided by detecting a modulated illumination signal provided by the illumination radiation. Hence, the TOF data can be derived by detecting a modulated portion of the (reflected) emitted light.

In one embodiment, the target identification functionality can be configured to provide or display the scene image and the pixel-related TOF data (or the target information) referenced to each other, in particular in an overlay manner. By that, a user guidance can be displayed on a display of the measuring device which shows the measuring scene according to the scene image and which also shows e.g. range data for each or for particular pixels (e.g. according to the target information) of the scene image. Hence, the user can make a decision about where in the scene a respective target is located, e.g. by clicking or touching on a respective region of the displayed image.

The TOF sensor should be understood as being embodied as an integrated sensor device which comprises a number of sensing pixels (arrays of pixels) which provide detection of the image data and which also provide detection of the TOF data, in particular detection of the modulated portion of the (reflected) illumination light.

In one embodiment, the illumination unit and the capturing unit are configured and arranged relative to each other so that an aperture angle for emitting the illumination radiation is equal or greater than an aperture angle for receiving illumination radiation reflected by the scene. When coaxially aligning the illumination unit and the capturing unit the entire field of view of the capturing unit can be illuminated by the illumination unit and TOF data can be gathered for the whole field of view with one shot.

In particular, deriving of the target information can comprise processing the pixel-related data by comparing first range data and/or the amplitude data (TOF data) of a first group of pixels (at least one single pixel) with second range data and/or the amplitude data of a second group of pixels (at least one single pixel) and identifying the target based on a difference between the first range data and the second range data. In particular, the pixels of the first group of pixels are adjacent to the pixels of the second group of pixels.

The target information can be derived in different ways. In particular, targets can be detected based on their related amplitude data, i.e. signal strength of a detected reflection. By that, by comparing a first set of pixels (e.g. having strong amplitude signal of a target) with a second set of pixels (e.g. having weak signal of background) identification can be performed. Hence, a direction to the target can be based on comparing of amplitude data across the image. Range (or distance to the target) can also be based on TOF information, as for example it can be image sensor taps or phase or pulse time of flight measurement e.g. based on waveform.

Performing an approach of above several pixels or sets of pixels can be analysed and compared with other pixels, in particular pixels which are near to each other. By that, e.g. a difference in range data for the pixels can be determined. A possible target may be identified in case one pixel (or the first group of pixels) comprises particular range or amplitude values which significantly differ from values e.g. of surrounding or neighbouring pixels (surrounding pixels may correspond to diffusely reflecting surfaces that may not comprise range values or are related to a value "0"). Such finding may be a clear hint for an object in the scene which is not part of a natural environment but may be artificial and be placed for particular purpose—like a geodetic target (e.g. reflector or pole).

Since the distance to such target may be known by TOF measurement (typically not as precise as by measurement with the EDM) and such information is provided to the operator of the device the operator can be enabled to individually or manually decide if the found object represents a target to be measured or not.

Accordingly, in some embodiments, the measuring device can comprise a display and the controlling and processing unit is configured to provide the TOF data on the display. Alternatively or additionally, the TOF data can be transmitted to a remote device for displaying and/or further processing. As for example, the data may be transmitted to a further surveying device for enabling the further device to efficiently aim the found target without having to perform further ATR or other search functionality.

According to one embodiment, the capturing unit can comprise an image sensor configured to capture a further (extended) scene image, wherein a resolution of the image sensor is greater than a resolution of the TOF sensor, in particular wherein an optical axis of the image sensor is coaxially coupled with an optical axis of the TOF sensor. By that, a further scene image can be generated by the further image sensor and TOF data can be registered relative to the image data of the image sensor.

Overlaying or referencing of the data of the TOF sensor and the image sensor becomes less complex due to possible use of a shared coordinate systems having a common origin.

In one embodiment the target identification functionality can be configured to process the TOF scene image and the enhanced scene image and to provide the TOF scene image and the first scene image in an overlay manner. The images can in particular be referenced to each other. Both images can simultaneously be displayed on a display of the measuring device or on a remote display (e.g. on a smart phone, tablet, laptop or the like).

In one embodiment the capturing unit can comprise either a filter that is switchable between VIS and IR, a divided filter, or a plurality of pixels sensitive for the VIS and a plurality of pixels sensitive for the IR spectrum. The pixels may be provided by the TOF sensor. The ability of processing and guiding light with different spectral properties in different manner can provide to perform different functionalities with one sensor. As for example the sensor of the capturing unit may be used for searching targets and for deriving range information.

The filter may be switchable between the visual spectrum (RGB) or (N)IR spectrum mechanically (filter swap). The TOF sensor may be embodied as a RGB-IR sensor to read out RGB and IR as separate channels of an RGB-IR sensor whose Bayer pattern has four channels (R,G,B,IR). The filter may by an IR-cut filter (extend the visual spectrum to include e.g. 10% IR by attaching an IR-cut filter).

According to an embodiment, the filter can transmit both VIS (e.g. the whole band) and a narrow band IR wavelength. If the IR band is narrow and attenuated, the RGB scene image may still have sufficient colour accuracy.

According to an embodiment, the capturing unit can comprise a narrowband transmission filter configured to transmit radiation of a wavelength band which comprises the wavelength of the illumination light and to block background radiation of a wavelength excluded from the wavelength band.

In one embodiment, in particular in context of above, the TOF sensor can be configured to provide a coloured scene image, wherein the pixels of the TOF sensor are configured to detect respective colour information.

The controlling and processing unit can in particular comprise an image capturing functionality which is configured for capturing the scene image by controlling the capturing unit. Accordingly, the image capturing functionality can be configured for capturing the scene image by means of the TOF sensor and/or the image sensor.

The measuring device comprises a functionality for searching targets in a scene. Such functionality may also be called ATR (Automatic Target Recognition) functionality.

In particular, the target illumination unit can be configured for variably illuminating at least a part of the scene, i.e. to provide illumination of different parts of the scene in different points in time.

The search data is gathered by the TOF sensor.

In one embodiment, the illumination unit may be configured for emitting illumination light to illuminate at least a part of the scene, wherein illumination light of the NIR or IR spectrum is emitted. In other words, the target illumination unit can comprise a (N)IR light source and provides (N)IR illumination light.

As already mentioned above, the capturing unit (TOF sensor) may accordingly be embodied or controlled for selectively receiving and detecting reflections of the illumination light (e.g. by use of a switchable filter). In other words, the controlling of the capturing unit can be provided by illumination-synchronised switching between IR and VIS transmission and/or detection of light. By that, a direction for respective reflections in the scene can be determined. Respective azimuthal and/or elevation angles can be determined.

In one embodiment, the target search functionality can be configured so that the target illumination unit provides flashed illumination of at least a part of the scene and the capturing unit provides flash-synchronised capturing of the search data of at least a part of the scene which is covered by the illumination. Here, variably illuminating is to be understood to provide timely selective illumination. By synchronising light detection of the capturing unit, the search functionality can be performed while simultaneously providing a live image of the scene, in particular if the durations for illumination and detection of illumination light are kept comparatively short.

According to one embodiment the target search functionality can be configured so that the target illumination unit provides an illumination fan which provides illumination of at least a part of the scene about a defined angular range in a first direction (e.g. elevation), wherein an orientation of the illumination fan is varied in a second direction (e.g. azimuthal), in particular continuously varied, and the capturing unit can provide orientation-synchronised capturing of the search image data of at least a part of the scene which is covered by the illumination, wherein a capturing direction for capturing the search image data is varied in the second direction in a manner synchronised with varying the orientation of the illumination fan.

In above embodiment variably illuminating is to be understood at least as the illumination covering only a part of the scene and the direction of the illumination is varied. Changing the capturing direction for capturing the search image data may be provided by selectively controlling particular pixels of the sensor (e.g. one or more rows/columns of the pixel array) and reading out those pixels. The set of selectively controlled pixels can be varied respectively or may be maintained, e.g. in case of rotating an telescope (directing unit) of the measuring device.

In particular, the capturing unit, e.g. the TOF sensor, comprises a rolling shutter. Alternatively, the TOF sensor comprises a global shutter.

A global shutter may provide advanced optical efficiency and optimised peak power. By that, particular signal-to-background ration by using flashed illumination light with very short pulse duration (e.g. 100 μs) can be provided.

To provide an ATR functionality by the capturing unit a switchable spectral filter can be provided to switch between visible image (normal sensor function) and NIR image (for search). Likely the sensor can be used in a binning mode (e.g. 2×2 binning mode) during search to allow higher frame rates.

In some embodiments, the controlling and processing unit comprises a target differentiation functionality for differentiating at least two particular targets of a set of targets, the target differentiation functionality is configured for executing the target identification functionality and executing the target search functionality with respect to a particular part of the scene, wherein the target information and the search image data are processed so that a direction to each of the at least two targets is derived with respect to the measuring device based on the target search functionality and a range value is derived and associated to each of the at least two targets based on the target identification functionality.

In one embodiment both sensors the TOF sensor and the image sensor can be run in parallel during search and especially during tracking of a target. By doing this not only the target direction is determined but also the target distance (by TOF data), what is especially helpful in case there are multiple targets in the FOV (field of view) of the image sensor which provides the scene image. While tracking a target the path of the selected target might get close to other unwanted targets. By using the additional distance information of the TOF sensor, the desired target can be selected much easier increasing the robustness in tracking mode.

According to some embodiments, an optical axis of the distance measuring unit, in particular the emitting unit (e.g. EDM), is coaxially aligned with an optical axis of the capturing unit, in particular with the optical axis of the TOF sensor. Having a common optical axis of the TOF sensor and the EDM, the TOF sensor may also be understood as an on-axis camera (OAC). The optical axes may be aligned coaxially by use of a semi-transparent mirror, beam splitter or other optical element. An advantage of such arrangement is given by generating an image with the sensor which is parallax-free relative to the aiming direction of the EDM. As a consequence there is no need for complex coordinate transformations providing accordance of a point the measuring radiation is directed to an the respective point in the image.

In particular, the optical axis of the illumination unit coaxially aligned with the optical axes of the capturing unit and the distance measuring unit.

Another advantage of a parallax free arrangement is to provide to see a target (at all) even at short distances. The camera typically has a small field of view (e.g. 1.5 degrees). Hence, in case of an axis-offset the target would not be covered when the EDM aims at when the distance is below a certain value.

In one embodiment the distance measuring unit, in particular the receiving unit, and the capturing unit are provided in combined manner and the TOF sensor is configured for detecting an interference resulting from the measuring radiation reflected by the target and a local oscillation radiation. By that, absolute distance measurement to an object can be provided according to the principle of cFMCW interferometry (Coherent Frequency Modulated Continuous Wave) which is described in more detail below.

According to one embodiment the measuring device can comprise a zoom objective, wherein the zoom objective and the capturing unit are arranged so that an optical axis of the zoom objective and an optical axis of the capturing unit are coaxial or parallel and an orientation of the coaxial axes is alignable by means of the directing unit. In particular, the TOF sensor and the zoom objective are arranged so that the optical axis of the TOF sensor extends through the zoom objective and (illumination) light received by the zoom objective is directed to the TOF sensor.

Such arrangement of the measuring device enables to use the OAC (or the TOF sensor) for searching targets. By making use of the focusing capability (zoom objective) target image blur can be reduced or avoided in closer distances during searching and/or tracking. In particular, there would be no need for a second image sensor in the telescope like a particular ATR camera.

Particular advantages of the present disclosure are cost, size and weight savings when simplifying the telescope design and reducing the number of sensors needed. Furthermore, ATR can be provided by using focusing to measure passive targets and reflective tapes at close distance. The ATR wavelength range can be increased. To improve the signal detection of reflective tapes, a visible wavelength illumination which is not attenuated by a NIR filter can be added.

Measuring devices according to prior art, often comprise an optical viewfinder. In light of the disclosure, the visual channel can be replaced with an electro-optical viewfinder (EOV) module. Thanks to the high sensor framerates (e.g. provided by a global shutter), a display lag can be very small, thus giving a responsive user experience on a display. To emulate a constant availability of the optical channel, a dedicated live-view button that immediately switches to camera live-view mode and then back again can be provided. Alternatively, the live video can be shown in an always-visible "picture in picture" window besides the rest of the UI.

By getting rid of the optical viewfinder, typically more light (compared to prior art with viewfinder) is available for the camera (OAC sensor). By that, there is a larger amount of visible light available.

Using a sensor which receives a large amount of visible light, a better sensitivity than with the naked eye can be reached so that manual aiming will be possible in darker environments than today. One could additionally implement a "night mode" which provides good quality still images even in almost total darkness by averaging over many images in a burst and performing advanced de-noising.

BRIEF DESCRIPTION OF THE DRAWINGS

By way of example only, the inventive aspects are described or explained in more detail below, purely by way of example, with reference to the accompanying figures. Identical elements are labelled with the same reference numerals in the figures. The described embodiments are generally not shown true to scale and they are also not to be interpreted as limiting. Specifically.

DETAILED DESCRIPTION

Figure 1:
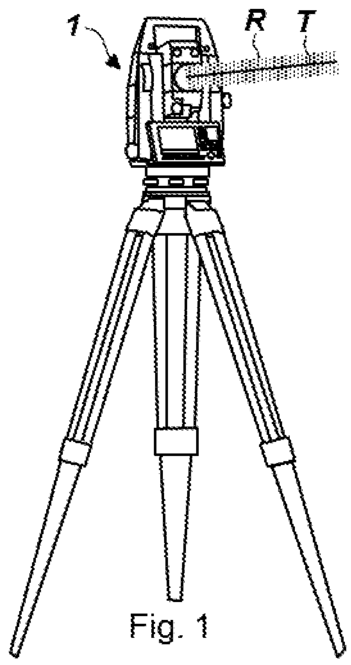
FIG. 1 shows an exemplary measuring device embodied as a total station.
Figure 2:
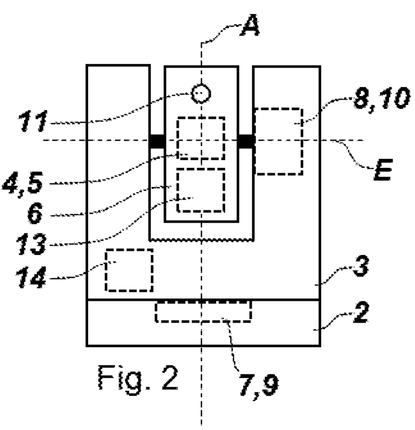
FIG. 2 shows the total station from FIG. 1 in a schematic view.

FIG. 1 shows a measuring device built as a total station 1 for acquiring three-dimensional measuring points. An abstracted illustration of the main components is provided in FIG. 2. The total station 1 comprises a base unit 2, a support unit 3 mounted on the base unit 2 and rotatable relative to the base unit 2 around an azimuth axis A, a distance measuring unit with an emitting unit 4 configured for providing a transmission beam T and a receiving unit 5 configured for detecting a reception beam R. A directing unit 6 is mounted in the support unit 3, rotatable relative to the support unit 3 around an elevation axis E and configured for directing the transmission beam T from the emitting unit 4 towards a scene and directing the reception beam R from the scene to the receiving unit 5. The directing in this example of a total station is done by projection optics in a telescope. In other examples, e.g. a laser scanner, the directing unit may be a high-speed rotating mirror, wherein the emitting unit and the receiving unit are arranged in the support unit and the mirror deflects the transmission beam and reception beam to/from the scene.

The emitting unit and the receiving unit may be understood as part of an electronic distance meter (EDM) or also known as range finder using time of flight, multiple frequency phase-shift, or interferometry technology. The distance measuring unit may be understood to be the EDM. For example, the emitting unit is a light source, in particular a laser diode, and the receiving unit comprises a sensor configured to detect the reflections of the light that the emitting unit is transmitting.

A first actuator 7 is provided for rotating the support unit 3 relative to the base unit 2 around the azimuth axis A, and a second actuator 8 is provided for rotating the directing unit 6 relative to the support unit 3 around the elevation axis E. A first angle encoder 9 is provided for measuring a rotatory position of the support unit 3 relative to the base unit 2 around the azimuth axis A, and a second angle encoder 10 is provided for measuring a rotatory position of the directing unit 6 relative to the support unit 3 around the elevation axis E.

A capturing unit 11, arranged here in the directing unit 6, comprises a sensor (see FIG. 3) and is configured for capturing a scene image of at least part of the scene. The capturing unit 11 is here located in the directing unit 6, but in other embodiments, the capturing unit 11 may as well be located in the support unit or the base unit. It may further stand out of (externally attached to) these components so as to not form an integrated part of the components.

A controlling and processing unit may be a single component of the measuring system, or it may itself comprise several physically distributed units. In the shown example, the controlling and processing unit comprises a field programmable gate array (FPGA) 13 and a central processing unit (CPU) 14. In other embodiments, the controlling and processing unit comprises a network connector and a remote server configured for performing at least some of the data processing. The controlling and processing unit is preferably connected to the first angle encoder 9, the second angle encoder 10, the camera 11, the first actuator 7, and the second actuator 8.

Figures 3, 4:
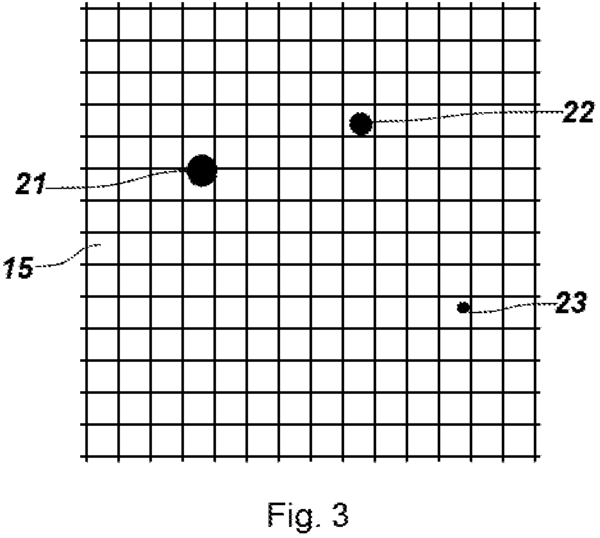
FIG. 3 shows a TOF sensor of the total station from FIG. 1.
FIG. 4 shows overlayed images of an image sensor and of a TOF sensor of a total station from FIG. 1.

As shown in FIG. 3, the capturing unit comprises a Time-Of-Flight (TOF) sensor 15. The TOF sensor provides a sensor plane having an array of pixels and is capable of providing range data for each pixel of the array. Hence, the TOF sensor is built to provide range data with each pixel. The data provided by the array of pixels may preferably be provided in form of a point cloud. The TOF sensor thus provides multiple distance data for a captured scene.

In other words, the TOF sensor is configured for providing TOF data of at least part of the scene, wherein the TOF data can comprise range data.

The controlling and processing unit comprises a target identification functionality which is configured for processing data provided by the TOF sensor. Based on the TOF data target information can be derived. The target information may comprise a direction to a target with respect to the measuring system and respective range data associated to the target. It may also or alternatively comprise a signal strength (amplitude data). Together with range information, it can be verified if a target is e.g. a prism corner cube retro-reflector (greater signal strength) or a reflective tape (smaller signal strength).

According to this embodiment, the TOF sensor is also capable for capturing an image of the scene and the image data can be related to the TOF data. By that, respective markers may be added to the image, wherein each marker represents a target which may be identified by processing TOF data.

For identifying a target, the TOF data may comprise a TOF image which comprises the amplitude or range data as pixel-related data and the target information can be derived by processing the pixel-related data by comparing first amplitude (or range) data of a first group of pixels with second amplitude (or range) data of a second group of pixels and identifying the target based on a difference between the first amplitude data and the second amplitude data, the pixels of the first group of pixels are preferably adjacent to the pixels of the second group of pixels. By such approach a target may be identified based on significantly differing amplitude or distance values of (neighbouring) pixels.

In other words, a target or a plurality of targets can be detected by analysing the TOF data with respect to increased amplitudes across the TOF image. Regions of the TOF image which comprise low (or even zero) amplitude may be considered to be background pixels (e.g. considered as the first group of pixels) while such regions with higher amplitudes (e.g. considered as the second group of pixels) may be considered to be related to reflecting targets to be found. The light reflected at the target and detected on side of the TOF sensor provides increased amplitude values. By that, directions (and distances) to the targets can be determined. Alternatively, instead of using amplitude data derived range data can be used to determine respective directions (and distances) to the targets.

A scene image can additionally be used for more precise target identification by analysing the pixels surrounding the positions of increased TOF amplitudes (target spot in TOF image). Such approach is also shown with FIG. 4, where the TOF image is overlaid by an additional scene image of an additional image sensor.

The TOF sensor may be configured to detect light of the visual-spectrum (VIS) and light of the IR spectrum.

FIG. 3 shows three particular targets 21-23 which are identified by means of processing the range or amplitude data of the TOF sensor. Respective directions to or positions of the targets are depicted by their positions on the TOF sensor. A distance to a respective target is represented by the size of its marker.

FIG. 4 shows a further embodiment. The capturing unit additionally comprises an image sensor 25 configured for capturing a further scene image, wherein a resolution of the image sensor is greater than a resolution of the TOF sensor 15. FIG. 4 shows an overlap of sensor planes according to their coaxial alignment or according to calculated registrations of their coordinate systems. The TOF sensor accordingly provides a TOF scene image.

The capturing unit and its image sensor 25 may be arranged so that an optical axis of the image sensor 25 is coaxial with the optical axis of the EDM. The image sensor 25 may also (besides the TOF sensor) be called an On-Axis-Camera (OAC). Such coaxial alignment can for example be provided by coupling the optical axes by means of a beam splitter of semi-transparent mirror.

In some embodiments, the optical axis of the TOF sensor may also be coaxially aligned with the optical axis of the EDM.

Such an optical system in a measuring system has the advantage to use the focusing capability of device optics (e.g. a zoom objective), e.g. to avoid target image blur in closer distances during search or tracking. There would be no need of a further image sensor in the telescope like an ATR camera of today's devices.

Accordingly, the OAC, in particular the TOF sensor, can be configured to overtake the ATR functionality. For that, a switchable spectral filter may be provided to switch between visible image (normal OAC function) and (N)IR image (for aiming). The OAC sensor is embodied to sensitively detect light of the VIS and the (N)IR spectrum. In particular, the OAC can be driven in a 2×2 binning mode during aiming to allow higher frame rates.

To additionally take advantage of the TOF sensor for aiming, too, both sensors (TOF and image sensor) can be run in parallel during target search and also for tracking a target. By gathering information with both sensors not only the target direction is determined but also the target distance can be derived. This may especially be helpful in case there are multiple targets in the scene. As for example, while tracking a target the path of the selected target might get close to other unwanted targets. By using the additional distance information, the desired target gets selected much easier increasing the robustness in tracking mode.

According to an embodiment, the controlling and processing unit can comprise a target differentiation functionality for differentiating at least two particular targets of a set of targets. The target differentiation functionality is configured for executing the target identification functionality (using the TOF sensor 15 and gathering range data) and executing the target search functionality with respect to a particular part of the scene. The provided target information and the search image data are processed so that a direction to each of the targets 21-23 is derived with respect to the measuring system based on the target search functionality and a range value is derived and associated to each of the targets 21-23 based on the target identification functionality.

A target can be understood as an object the distance and direction to which should be determined. The target may preferably be a surveying target such as a retro reflector, a surveying pole or any other kind of reflective object located at an object to be measured and/or to be tracked.

According to some embodiments, the TOF sensor is used for accurately measuring a particular distance to a target by means of the distance measuring unit (e.g. the EDM). For that, the method of cFMCW interferometry (Coherent Frequency Modulated Continuous Wave) can be implemented and a coherent superposition of a wavelength tunable laser can be utilized. Here, the TOF sensor provides the distance measuring device of the measuring device 1.

The light source can be configured to vary the wavelength repeatedly over time. A part of the laser light is sent directly to a detector as a local oscillator, while another part of light is directed to an object (measuring radiation). The light coming from the object (measuring radiation reflected by the target) interferes with the light of the local oscillator at the TOF image detector. Due to the time delay between the portions of radiation, the amplitude of a resulting interferogram is a beat wave with a much lower beat frequency to be determined. While the carrier frequency in THz range may be too great to be detected, the beat wave in MHz range can be resolved by the TOF sensor, e.g. by Lock-In technology implemented in the TOF sensor. The frequency of the detected beat frequency peak is linearly proportional to the distance of the object.

In particular, the TOF sensor is configured to provide a particular mode: the frequency of switching mechanism between different Taps should sweep accordingly synchronized with the wavelength sweeping of the laser source. The frequency calculation is performed by searching the timing of maximal signal response during a sweeping period. This approach requires a fine variation of the sampling frequency of the period and, hence, of the sampling frequency of the TOF image sensor.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A measuring device for acquiring a three-dimensional measuring point related to a target in a scene, the measuring device comprises:

a base unit, a support unit mounted on the base unit and rotatable relative to the base unit around an azimuth axis, a distance measuring unit comprising an emitting unit configured for emitting collimated measuring radiation and a receiving unit configured for detecting at least a part of the collimated measuring radiation reflected by the target, a directing unit arranged at the support unit, rotatable relative to the support unit around an elevation axis, and configured for directing the collimated measuring radiation towards the scene, a capturing unit configured for capturing at least a scene image of at least part of the scene, an illumination unit configured for illuminating at least a part of the scene with illumination radiation, wherein the illumination radiation comprises a modulated illumination signal, and a controlling and processing unit configured at least for aligning the directing unit, wherein:

the capturing unit comprises a Time-Of-Flight (TOF) sensor, wherein the TOF sensor is configured for providing:

the scene image by generating pixel-related image data, wherein the scene image is generated by detection of visual-spectrum and/or near-infrared-spectrum light by means of the TOF sensor, and pixel-related TOF data of at least part of the scene, the TOF data comprises at least range data and/or amplitude data for each pixel, the pixel-related TOF data is associated with the pixel-related image data so that each pixel of the pixel-related TOF data is assigned to at least one pixel of the pixel-related image data, the controlling and processing unit comprises a target search functionality which is configured for controlling the target illumination unit so that at least a part of the scene is illuminated and for controlling the TOF sensor so that pixel-related TOF data of at least a part of the illuminated scene is obtained as search data, wherein illuminating at least a part of the scene and obtaining the search data are synchronised so that the search data is obtained for at least the part of the scene which is illuminated, and the controlling and processing unit comprises a target identification functionality which is configured to process the search data and to derive target information based on the search data, wherein the target information comprises a direction to the target with respect to the measuring device and TOF data associated to the target.

2. The measuring device according to claim 1, wherein:

the pixel-related TOF data is generateable by detecting a modulated illumination signal provided by the illumination radiation and/or the pixel-related image data is generateable by detecting non-modulated signal of the visual-spectrum light and/or the near-infrared-spectrum light by means of the TOF sensor, in particular a non-modulated illumination signal of the illumination radiation.

3. The measuring device according to claim 1, wherein the target identification functionality is configured to provide or display the scene image and the pixel-related TOF data or the target information referenced to each other, in particular in an overlay manner.

4. The measuring device according to claim 1, wherein the optical axis of the distance measuring unit is coaxially aligned with the optical axis of the illumination unit and with the optical axis of the capturing unit.

5. The measuring device according to claim 1, wherein:

the measuring device comprises a zoom objective, and the zoom objective and the capturing unit are arranged so that an optical axis of the zoom objective and an optical axis of the capturing unit are coaxial and an orientation of the coaxial axes is alignable by means of the directing unit, in particular wherein the TOF sensor and the zoom objective are arranged so that:

the optical axis of the TOF sensor extends through the zoom objective and light received by the zoom objective is directed to the TOF sensor.

6. The measuring device according to claim 1, wherein:

the illumination unit and the capturing unit are configured and arranged relative to each other so that an aperture angle for emitting the illumination radiation is equal or greater than an aperture angle for receiving illumination radiation reflected by the scene, and/or the capturing unit comprises a narrowband transmission filter configured to transmit radiation of a wavelength band which comprises the wavelength of the illumination light and to block background radiation of a wavelength excluded from the wavelength band.

7. The measuring device according to claim 1, wherein the TOF sensor is configured to provide a coloured scene image, wherein the pixels of the TOF sensor are configured to detect respective colour information.

8. The measuring device according to claim 1, wherein deriving the target information comprises processing the pixel-related data by comparing first TOF data of a first group of pixels with second TOF data of a second group of pixels and identifying the target based on a difference between the first and the second TOF data.

9. The measuring device according to claim 1, wherein:

the capturing unit comprises an image sensor configured for capturing an extended scene image, and a resolution of the image sensor is greater than a resolution of the TOF sensor.

10. The measuring device according to claim 9, wherein the target identification functionality is configured to process the TOF scene image and the extended scene image and to provide the TOF scene image and the extended scene image referenced to each other, in particular in an overlay manner.

11. The measuring device according to claim 1, wherein the target search functionality is configured so that:

the illumination unit provides flashed illumination of at least a part of the scene, and the capturing unit provides flash-synchronised capturing of the search data of at least a part of the scene which is covered by the illumination.

12. The measuring device according to claim 1, wherein the target search functionality is configured so that:

the illumination unit provides an illumination fan which provides illumination of at least a part of the scene about a defined angular range in a first direction, wherein an orientation of the illumination fan is varied in a second direction, in particular continuously varied, and the capturing unit provides orientation-synchronised capturing of the search data of at least a part of the scene which is covered by the illumination, wherein a capturing direction for capturing the search data is varied in the second direction in a manner synchronised with varying the orientation of the illumination fan.

13. The measuring device according to claim 1, wherein the target illumination unit comprises a infrared light source and provides infrared illumination light and controlling of the capturing unit is provided by illumination-synchronised switching between infrared and visual-spectrum transmission and/or detection of light.

14. The measuring device according to claim 1, wherein:

the controlling and processing unit comprises a target differentiation functionality for differentiating at least two particular targets of a set of targets, the target differentiation functionality is configured for executing the target identification functionality and executing the target search functionality with respect to a particular part of the scene, and the target information and the search data are processed so that:

a direction to each of the at least two targets is derived with respect to the measuring device based on the target search functionality and a range value is derived and associated to each of the at least two targets based on the target identification functionality.

15. The measuring device according to claim 1, wherein the distance measuring unit and the capturing unit are provided in combined manner and the TOF sensor is configured for detecting an interference resulting from the measuring radiation reflected by the target and a local oscillation radiation.

* * * * *